(12) United States Patent
Trost

(10) Patent No.: US 12,110,452 B2
(45) Date of Patent: Oct. 8, 2024

(54) USE OF CARBON MONOXIDE AND LIGHT HYDROCARBONS IN OIL RESERVOIRS

(71) Applicant: Paul B. Trost, Golden, CO (US)

(72) Inventor: Paul B. Trost, Golden, CO (US)

( * ) Notice: Subject to any disclaimer, the term of this patent is extended or adjusted under 35 U.S.C. 154(b) by 0 days.

(21) Appl. No.: 18/157,230

(22) Filed: Jan. 20, 2023

(65) Prior Publication Data

US 2023/0235215 A1 Jul. 27, 2023

Related U.S. Application Data

(60) Provisional application No. 63/309,676, filed on Feb. 14, 2022, provisional application No. 63/361,786, filed on Jan. 21, 2022.

(51) Int. Cl.
*C09K 8/594* (2006.01)
*C09K 8/38* (2006.01)

(52) U.S. Cl.
CPC .............. *C09K 8/594* (2013.01); *C09K 8/38* (2013.01)

(58) Field of Classification Search
None
See application file for complete search history.

(56) References Cited

U.S. PATENT DOCUMENTS

| | | | |
|---|---|---|---|
| 2,957,818 A | 10/1960 | Fischer | |
| 3,007,520 A | 11/1961 | Frey | |
| 3,457,996 A | 7/1969 | Parker | |
| 4,127,171 A * | 11/1978 | Allen | E21B 43/243 166/260 |
| 4,156,462 A * | 5/1979 | Allen | E21B 43/24 166/402 |
| 4,203,853 A * | 5/1980 | Allen | E21B 43/243 546/172 |
| 4,233,166 A * | 11/1980 | Allen | C09K 8/594 166/402 |
| 4,487,264 A * | 12/1984 | Hyne | E21B 43/24 166/402 |
| 4,557,330 A * | 12/1985 | Fussell | E21B 43/168 166/402 |
| 4,573,530 A * | 3/1986 | Audeh | E21B 43/243 166/260 |
| 5,769,165 A * | 6/1998 | Bross | E21B 43/255 166/266 |
| 7,506,685 B2 | 3/2009 | Zubrin et al. | |
| 9,951,594 B2 | 4/2018 | Trost | |
| 10,316,631 B2 | 6/2019 | Trost | |
| 10,876,384 B2 | 12/2020 | Trost | |
| 2012/0138316 A1* | 6/2012 | Matzakos | E21B 43/16 166/400 |
| 2014/0213669 A1* | 7/2014 | Herrmann | C10G 2/341 518/715 |
| 2015/0240610 A1* | 8/2015 | Trost | E21B 43/168 166/308.2 |
| 2018/0202272 A1* | 7/2018 | Trost | C09K 8/70 |

OTHER PUBLICATIONS

Markey, Craig, "Geophysical properties of carbon monoxide when used as an enhanced oil recovery agent," Colorado School of Mines, 2015.

* cited by examiner

*Primary Examiner* — John J Figueroa
(74) *Attorney, Agent, or Firm* — Holzer Patel Drennan

(57) ABSTRACT

Injecting into an oil reservoir a gaseous mixture of carbon monoxide (CO) together with gaseous hydrocarbons comprising a mixture of one or more of methane (C1), ethane (C2), propane (C3), butane (C4), pentane (C5), and natural gasoline, also referred to as NGL, for the purpose of achieving additional oil recovery from any of conventional, heavy, and unconventional oil reservoirs, including shale oil reservoirs. The gaseous hydrocarbons and the CO may range from 0.1% gaseous hydrocarbons and 99.5% CO and associated minor gases including any of CO2, H2, N2 to 98.5% gaseous hydrocarbons and 1.5% CO and associated minor gases.

7 Claims, No Drawings

USE OF CARBON MONOXIDE AND LIGHT HYDROCARBONS IN OIL RESERVOIRS

CROSS-REFERENCE

This application claims priority to U.S. provisional application 63/361,786 filed Jan. 21, 2022 and titled "USE OF CARBON MONOXIDE AND A MIXTURE OF LIGHT HYDROCARBONS TO ACHIEVE ADDITIONAL OIL RECOVERY FROM SHALE OIL AND OTHER RESERVOIRS" and to U.S. provisional application 63/309,676 filed Feb. 14, 2022 and titled "USE OF CARBON MONOXIDE AND A MIXTURE OF LIGHT HYDROCARBONS TO ACHIEVE ADDITIONAL OIL RECOVERY FROM CONVENTIONAL, UNCONVENTIONAL, AND HEAVY OIL RESERVOIRS," the entire disclosures of which are incorporated herein by reference for all purposes.

BACKGROUND

In conventional oil reservoirs, unconventional (shale oil) reservoir, and heavy oil reservoirs, oil is present in voids between the mineral grains but is also sorped onto the surface of the mineral grains. Oil may be sorped on mineral or even solid kerogen-like surfaces and held by capillary forces, van der Waals forces, polar interactions between the oil and adsorbing surfaces, and/or other forces. To extract the oil from these locations, pressure pushes the oil through extremely small permeability channels (pore throats) or fractures to a nearby well bore. Unfortunately, many permeability pore throats are smaller than the oil droplets, thus restricting the oil migration to the well bore. This is more common as the reservoir loses its natural or induced pressure, resulting in the oil droplets becoming effectively trapped. Quite often, pore throats are naturally lined with clays, some of which may be swelling clays such as smectite and montmorillonite. Thus, any compound or chemical that could effectively increase the diameter of the pore throats would be very beneficial to additional oil recovery.

Since many oil reservoirs also contain water, another problem for oil migration arises due to the relative permeability of the water as compared to that of oil. The water, generally being of lower viscosity and often a smaller molecule, will preferentially migrate through the small pore throats to the well bore. However, if a compound or chemical could act as a surfactant and lower the interfacial tension (IFT) between the oil and water, additional oil may also be dragged to the well bore resulting in increased oil recovery.

As production of oil continues and the reservoir ages, the relative mobility of gas in the reservoir far exceeds that of oil; thus, additional gas is obtained from the well. Such gas may, however, be beneficially employed to achieve additional oil production by the recovery, compression and re-injection of a portion of the gas into the reservoir. Re-pressurization of the formation and the presence of the gas may also act as a solvent for heavier oil molecules. Typically, gases containing C1-C6 and natural gasolines, generally referred to as NGLs (natural gas liquids) or "Y grade," are reintroduced along with other associated hydrocarbons such as aromatic hydrocarbons like, but not limited to, benzene, xylene, toluene, and others. Alternately, gases containing only C2-C5 or C2-C6 may be preferred, depending on reservoir conditions. Another alternative is to only inject a portion of the NGLs, such as only ethane (C2) and/or propane (C3), or even just the methane (C1) along with agents such as surfactants.

Addition of NGL and NGL-type hydrocarbons has been documented and utilized over the past 70 years by various oil production operators. Although the injection of these NGLs facilitates the extraction and removal of oil from the reservoir, there is always room for improvement.

SUMMARY

The present invention is thus directed to the addition (e.g., injection) of CO (carbon monoxide) with an NGL or NGL-type gas mixture, in some embodiments also with $CO_2$, into oil reservoirs to recover additional oil from the reservoir, and/or alternately achieve a well bore remediation program. These gases (NGL or NGL-type and CO, and optionally $CO_2$) can be added to the reservoir pre-mixed, independently yet simultaneously, or independently and sequentially. Application of this gas mixture (NGL or NGL-type gas or any single NGL gas, and at least CO with optional $CO_2$) may be especially well suited for shale oil reservoirs, conventional reservoirs, and heavy oil reservoirs to increase the production of oil therefrom.

Additionally, the co-injection of the CO and NGL or NGL-type gases may aid in the remediation of any undesirable black sludges or "schmoo" present in the reservoir, due to the attraction of the CO to asphaltenes that may be present, allowing recovery of the material.

The NGL or NGL-type gases are light hydrocarbon gases, such as C1-C5 (methane through pentane), C1-C6 (methane through hexane), or depending on reservoir conditions, C2-C5, or C2-C6. In some gaseous mixtures, some heavier hydrocarbons such as C6-C8 or aromatics may be present. The individual concentration of each individual hydrocarbon component will generally be selected to maximize hydrocarbon recovery based upon each individual reservoir's mineralogy, chemical composition of the oil, and other parameters such as gas availability, reservoir pressures, temperatures, and numerous other existing reservoir conditions as may be determined. In some cases, each hydrocarbon may range from essentially de minimus (e.g., 0.1%) concentration or less, up to 95% of the NGL or NGL-type hydrocarbon mixture, with other hydrocarbons making up the remainder of the composition in varying proportions.

The CO may be pure, or essentially pure CO, or may be a mixture with at least two or more other gases in minor amounts, such as $CO_2$, $N_2$, and $H_2$. The $CO_2$, $N_2$, and $H_2$ are minor components, typically produced during the production of CO, and are no more than 50% by volume of the non-NGL gas, or, the CO, usually no more than 20%.

The injected gas mixture includes at least 1.5% by volume CO, in some embodiments at least 5% by volume CO, in some embodiments at least 25% CO, in other embodiments at least 50% CO, and in other embodiments at least 75%. The NGL or NGL-type hydrocarbons and the CO may range from 0.1% gaseous hydrocarbons and 99.5% CO and associated minor gases including any of $CO_2$, $H_2$, $N_2$ to 98.5% gaseous hydrocarbons and 1.5% CO and associated minor gases. For example, the gas mixture may be 40-75% NGL or NGL-type gases with 25%-40% CO. In another example, the gas mixture may be 50-99% CO and 1-50% NGL or NGL-type. In another example, the gas mixture may be 50-99% NGL or NGL-type and 1-50% CO. The particular percentage or ratio of CO to the NGLF or NGL-type hydrocarbons is dependent on the reservoir's mineralogy and presence of impurities, chemical composition of the oil, and other parameters that are designed to achieve maximum oil recovery.

A purpose for mixing CO with the light hydrocarbons is to achieve greater enhanced oil recovery by combining the unique benefits of the organic solvents and the numerous benefits of CO, thereby achieving better symbiotic results and increasing oil recovery while lowering compression operating costs by operating at pressures 10-40% of what would normally be expected.

DETAILED DESCRIPTION

As discussed above, the injection of NGL or NGL-type gases (e.g., C1-C5, C2-C5, C2-C6, etc.) facilitates the extraction and removal of oil from reservoirs. These injected gases help solubilize the heavier hydrocarbons, repressurize the reservoir, act as solvents for heavier hydrocarbons, open blocked pore throats, and lower overall oil viscosity.

Carbon monoxide (CO) has been shown by Trost (see, e.g., U.S. Pat. Nos. 9,951,594 B2, 10,316,631 B2, and 10,876,384 B2) to aid in oil recovery and provide other benefits when injected into the reservoir. For instance, (1) CO has the capability of lowering the IFT by acting as a surfactant, (2) CO, a reducing agent, is capable of reacting with ferric iron in swelling clays to shrink the clays and thus increase pore throat diameters, (3) CO can alter oil wet reservoirs to water wet reservoirs due to its polarity and capability of liberating adsorbed hydrocarbons off of the reservoir mineral surfaces, (4) CO achieves swelling of the oil thus decreasing the viscosity of the oil, (5) CO adsorbs onto asphaltenes thereby partially liberating the associated long chain paraffins, resins, and other heavy oil molecules, (6) CO inhibits corrosion of oilfield tubulars, (7) CO reacts with free $O_2$ contained within injected fluids to convert them to $CO_2$, (8) CO has some solubility in crude oil, and being a small molecule, has been shown to aid in the faster recovery of the oil and to access lower permeability areas of the reservoir that have higher residual oil saturation, and (9) the presence of CO allows oil recovery at lower pressures thereby providing an economic advantage. These qualities and benefits are due to the introduction of CO into the reservoir.

Thus, a combination of the NGL or NGL-type gases and CO, or CO with associated $CO_2$, results in a multifaceted approach to achieve additional or enhanced oil recovery. The addition of surfactants to lower the Interfacial Tension (IFT) between the oil and the water would further aid oil recovery.

Injection of CO, or $CO+CO_2$, and the appropriate mixture of NGL or NGL-type gases, achieves additional oil recovery in a variety of physical and chemical methods. As shown by Trost, CO improves faster oil recovery as compared to pure $CO_2$. Furthermore, oil recovery with CO can occur at significantly lower pressures than with pure $CO_2$, thus minimizing the loss of the injected gases to fractures and faults. Injection of methane, ethane, propane and heavier hydrocarbons (the NGL and NGL-type hydrocarbons) can repressurize the reservoir and aid in mobilization of the heavier hydrocarbons to the well bore.

Due to the presence of the CO with the NGL or NGL-type gases, the injection and operating pressures of the gas mixture may be decreased or lowered as compared to the current high pressures required in typical NGL or NGL-type shale oil or other types of reservoirs, due to the CO shrinking swelled clays present in the reservoir that decrease pore throat diameter. The injection pressures are compatible with the reservoir physical and chemical properties to achieve maximum oil recovery, typically under immiscible conditions. The decrease in pressure may be as much as a 50% reduction, although in some environments, only a 10-40% reduction is obtained, which is a noticeable reduction nonetheless. Lowering of injection and operating pressures is highly economically beneficial, and lessens the risk of the injected gases escaping through fractures or other high permeability zones.

Although CO, carbon monoxide, is a relatively common molecule, sources of large volumes of CO are typically not available in suitable proximity to oil reservoirs. Onsite generation of the CO is therefore desired due to the very large volumes of CO required. Typically, CO is generated by the burning of other hydrocarbons such as coal, oil, gaseous hydrocarbons, flared natural gas or casing head gas, petcoke, or other low-cost organic fuel. The typical processes to produce CO, and slight variations there, are referred to as syngas, pyrolysis, and/or reforming; these processes produce byproducts of hydrogen ($H_2$), nitrogen ($N_2$), and $CO_2$. Thus, the syngas process, or reforming process, or other non-combustion process such as reduction of $CO_2$ to CO, may occur on site or nearby, to provide the required amounts of CO.

Often, the process to produce the CO can be referred to as a "green" process. As a syngas process produces significant heats of combustion, this heat of combustion can be captured and converted into electrical energy for use on site or sold. Since the CO and $CO_2$ products of syngas are injected downhole, and the $H_2$ recovered for economic benefit, the electrical generation associated with CO and $CO_2$ generation essentially results in zero or de minimus greenhouse gas emissions, e.g., due to sequestration within the reservoir.

Another "green" environmental benefit is to utilize the produced hydrocarbon gases and liquids available from adjacent wells and/or pipelines, materials that are typically flared resulting in significant greenhouse gas emissions. These previously-flared gases can be used in the present process by: (1) separating and recovering the desired hydrocarbons, (2) burning the recovered hydrocarbons to produce CO and $CO_2$, for combining with the NGLs and aiding oil recovery, and/or (3) injecting the recovered hydrocarbons into the reservoir. Environmental benefits and/or economic credits may be available due to sequestration of the previously-flared waste gases and the resulting CO, $CO_2$. Thus, the environmental liability of flaring/burning the waste gas is converted to an environmentally and economically beneficial cause, by eliminating the emission of greenhouse gases and sequestration of the $CO_2$ and CO within the reservoir coupled with enhanced oil recovery or well bore remediation.

Historically, compression costs of gases for injection into the reservoir are expensive. On-site production of CO and optionally $CO_2$, $N_2$ and/or $H_2$ (e.g., via a syngas or other processes) results in significant heat of combustion; this heat can be readily converted to emission free electrical energy. Capture of the heat of combustion and conversion to electrical energy results in zero emission electrical power available on site.

Temperature of the injected gases (i.e., the NGL or NGL-type gases and CO, at least) may vary widely and range from the exit temperature of the injection compressor down to ambient temperature. In certain cases, especially where the well bore perforations may be plugged, the gases may be heated above the outlet temperature of the compressor to achieve a faster reaction rate in the reservoir and improve well bore cleanup; this heating may be done, e.g., by the heat or electricity obtained from the previously-flared gases.

For shale oil recovery, horizontal wells are typically drilled parallel to each other during the development of a shale oil field. Occasionally, the introduced frac fluids in the newly drilled adjacent well may interact with the frac fluids and formation water of an earlier well, or with the reservoir rock in the newly drilled well, thereby creating a black sludge commonly referred to in the industry as "schmoo," "black sludge," "goo," or other such names. This black sludge inhibits the production of oil by blocking the pore throats and natural or produced fractures through which the oil is transported to the well bore. The schmoo or black sludge may also be present in the wellbore tubulars.

It is theorized that this black sludge is stabilized by the presence of ferric oxides and/or hydroxides, which may be a coating of ferric oxides or hydroxides on fine particles of reservoir matrix. The composition of the black sludge varies widely, but may include ingredients from the injected frac fluids such as polymers, friction reducers, oxygen scavengers, breakers, surfactants, gelling agents, inorganic compounds for pH adjustment and other organic chemicals. Thus, the injection of CO facilitates the reduction the ferric oxides and hydroxides to ferrous oxide and assists in the disaggregation of the sludge to open up pore throats and achieve additional oil flow to the well bore. Additionally, because of the effects of CO on heavy hydrocarbons, such as asphaltenes, which may form part of the "schmoo" or black sludge or other adverse precipitates, CO may assist in the dissolution and optionally eventual recovery of the material to improve reservoir permeability in those partially or totally plugged reservoir areas. To further aid remediation of the reservoir, additional reagents such as acids, surfactants, polymer breakers and other organic solvents may also be co-injected with the CO.

Therefore, the combination of CO, and optional minor amounts of $CO_2$, with light end hydrocarbons such as NGL or NGL-type hydrocarbons, of various ratios as determined by the oil and reservoir properties, achieves both increased oil recovery as an EOR (Enhanced Oil Recovery) process and also aids in the treatment of the "schmoo" or sludge.

The CO, either essentially alone or optionally with $CO_2$, and hydrocarbons are injected into the reservoir (e.g., shale oil reservoir, conventional reservoir, or heavy oil reservoir) as a gas mixture at rates and pressures as determined for individual reservoir conditions to achieve dispersion into the reservoir. Preferably, the CO, either as a single component, or CO with minor $CO_2$, wherein the contained $CO_2$ will typically, but not always, be less than 50% by volume of the total injected gas, is injected together downhole. By injecting the CO alone, or nearly alone, it could act as a spearhead by having a higher concentration and faster effect on achieving a chemical interaction with the black sludge or other pore blocking sludges.

Preferably the CO, and any $CO_2$ and other minor gases, are produced onsite utilizing waste or flared gas. Using the flared gas to instead produce the CO avoids greenhouse gas emissions associated with flaring. Thus, the non-flaring and subsequent conversion of the hydrocarbons to CO and possibly $CO_2$, provides sequestration and thus greenhouse gas reduction, possibly elimination.

The gas mixture includes at least 1.5% CO (including any minor amounts of $CO_2$, $N_2$, $H_2$), in some embodiments at least 5% CO, in some embodiments at least 25% CO, in other embodiments at least 50% CO. For example, the gas mixture may be 40-75% NGL or NGL-type gases with 25%-40% CO. In another example, the gas mixture may be 50-99% CO and 1-50% NGL or NGL-type gases. In another example, the gas mixture may be 1-50% CO and 50-99% NGL or NGL-type gases. A 50%-50% gas mixture has a ratio of 1:1 CO to hydrocarbons; other example ratios include 1:2, 1:3, 2:3, 2:1, 3:1, and 3:2 CO to hydrocarbons. The concentration of the CO and the NGL or NGL-type hydrocarbons is selected to maximize hydrocarbon recovery based upon each individual reservoir's mineralogy, chemical composition of the oil, and other parameters such as gas availability, reservoir pressures, temperatures, and numerous other existing reservoir conditions as may be determined.

The gas mixture may include an amount of $CO_2$, for example 1% $CO_2$, in some embodiments at least 10% $CO_2$. The ratio of $CO_2$:CO may be, e.g., 1:2, or 1:4, or 1:5. The $CO_2$ is typically less than 50% of the CO and typically less than 20% of the total gas mixture.

As indicated above, the gas mixture includes NGL and/or NGL-type hydrocarbons, which includes light hydrocarbon gases, ranging from C1-C6 (methane through hexane), natural gasoline, or any combination. In some embodiments aromatic hydrocarbons such as, but not limited to benzene, toluene, xylene, and others may be present.

The gas mixture may include at least 10% of C1-C6, in any ratio from 0.1-100% for individual components (e.g., 20% of each of C1, C2, C3, C4, C5; e.g., 20% of each of C2, C3, C4, C5, C6; e.g., 25% C1, 25% C2, 20% C3, 10% C4, 10% C5), in some embodiments at least 25% of the gas mixture. In some embodiments, the amount of each or any of C2-C6 is more than the amount of C1 present.

In one example, particularly for remediation of black sludge, the gas mixture may be at least 50% CO with the remainder of the gas mixture the NGL or NGL-type hydrocarbons, e.g., C1-C5 hydrocarbons. An example gas mixture is 50% CO and 50% NGL or NGL-type hydrocarbons, which is a 1:1 ratio; in other embodiments, the ratio is 2:1 or 3:2. In some embodiments, the hydrocarbon mixture will be composed of C2-C5 or C2-C6 with minimal C1. The total C2-C6 hydrocarbons may also be present at a ratio to CO of, e.g., 1:1, 1:2, 2:3. In another embodiment, the CO, and associated $CO_2$ and $H_2$, having concentrations ranging from 5%-49% of the total gas mixture, and the associated hydrocarbons such as C2-C5, or C2-C6 will be injected.

For treatment of the black sludge, additional aromatic hydrocarbons may also be included with the injected hydrocarbon and CO gas mixture. As an example, but not limited to, benzene, toluene, xylene, acetone, or other hydrocarbons that may help dissolve and/or disperse the black sludge. Additionally, or alternately, heavier hydrocarbons, e.g., C6-C8, may be present. The amount of any C6-C8 and aromatics, combined, is typically less than 25% by volume of the gaseous mixture.

Additionally, certain additional chemicals may be added to the gas mixture as liquids such as acids, bases, surfactants, polymer breakers, and others to further aid dissolution of the black sludge and aid oil recovery. These additives may vaporize when injected into the reservoir or may be liquid droplets carried by the gaseous mixture.

The above specification and examples provide a complete description of the structure and use of exemplary embodiments of the invention. The above description provides specific embodiments. It is to be understood that other embodiments are contemplated and may be made without departing from the scope or spirit of the present disclosure. The above description, therefore, is not to be taken in a limiting sense. For example, elements or features of one example, embodiment or implementation may be applied to any other example, embodiment or implementation described herein to the extent such contents do not conflict.

For example, the above specification provides for injection of a combination of CO, and minor amounts of $CO_2$, together with light hydrocarbons such as C1-C6 (methane through hexane and natural gasoline) and some heavier hydrocarbons such as C6-C8 or aromatics, to achieve additional oil recovery from unconventional shale oil reservoirs, conventional, and heavy oil reservoirs. This additional oil recovery can be measured as increased rate of oil production and/or as an increased total amount of oil production. The concentrations of the CO and hydrocarbons will vary depending on the chemical characteristics of the reservoir and the oil, but typically the CO will be greater than 5% of the injected CO/light hydrocarbons, more typically the CO concentration will be closer to 25-40% of the total gas volume injected. The specification also provides that injection of the CO and hydrocarbons, as a well bore remediation process and/or for treatment of the black sludge, may be in concentrations of 50% CO to almost 100% CO, with any remaining being the light end hydrocarbons and/or $CO_2$ and/or $H_2$. The gas mixture of CO and hydrocarbons, when used for a well bore remediation process and/or for treatment of black sludge and/or for additional oil recovery, may also contain certain other chemicals to facilitate the breakup of the black sludge, such chemicals being bases (e.g., sodium carbonate and bicarbonate), organic solvents, surfactants, acids, and polymer breakers, but not limited to the above.

A purpose of mixing CO with the light hydrocarbons is to achieve greater enhanced oil recovery by combining the unique benefits of the organic solvents and the numerous benefits of CO, thereby achieving a better symbiotic results and increasing oil recovery, the increased oil recovery being increased oil production rate and/or increased total volume oil produced. The use of CO in addition to the NGL or NGL-type gases, or other gases, allows injection and/or operating at pressures up to 50% less than when not using CO and NGL-type gases, while still recovering equivalent amounts of oil and lower costs.

While the present disclosure is not so limited, an appreciation of various aspects of the disclosure will be gained through a discussion of the examples provided above and the claims that follow.

The invention claimed is:

1. A method of oil extraction from an oil reservoir, comprising:
   injecting into the oil reservoir a gaseous mixture comprising:
   1.5% to 99% by volume carbon monoxide (CO) and any of carbon dioxide ($CO_2$), hydrogen ($H_2$), and nitrogen ($N_2$), and
   1% to 98.5% by volume gaseous hydrocarbons comprising one or more of methane (C1), ethane (C2), propane (C3), butane (C4), pentane (C5), hexane (C6), and natural gasoline.

2. The method of claim 1, wherein the gaseous mixture comprises at least 5% by volume CO.

3. The method of claim 1, wherein the gaseous hydrocarbons consists of one or more of C1-C6 and natural gasoline, each in a concentration of 0.1-100% by volume, if present.

4. The method of claim 1, wherein the gaseous hydrocarbons consists of one or more of C1-C5 and natural gasoline, each in a concentration of 0.1-100% by volume, if present.

5. The method of claim 1, wherein the gaseous mixture includes 0.1-30% by volume $CO_2$.

6. The method of claim 1, wherein the oil reservoir is one of a conventional reservoir, a heavy oil, or unconventional oil reservoir.

7. The method of claim 6, wherein the oil reservoir includes black sludge present therein, and wherein injecting the gaseous mixture remediates the black sludge.

* * * * *